Patented June 13, 1939

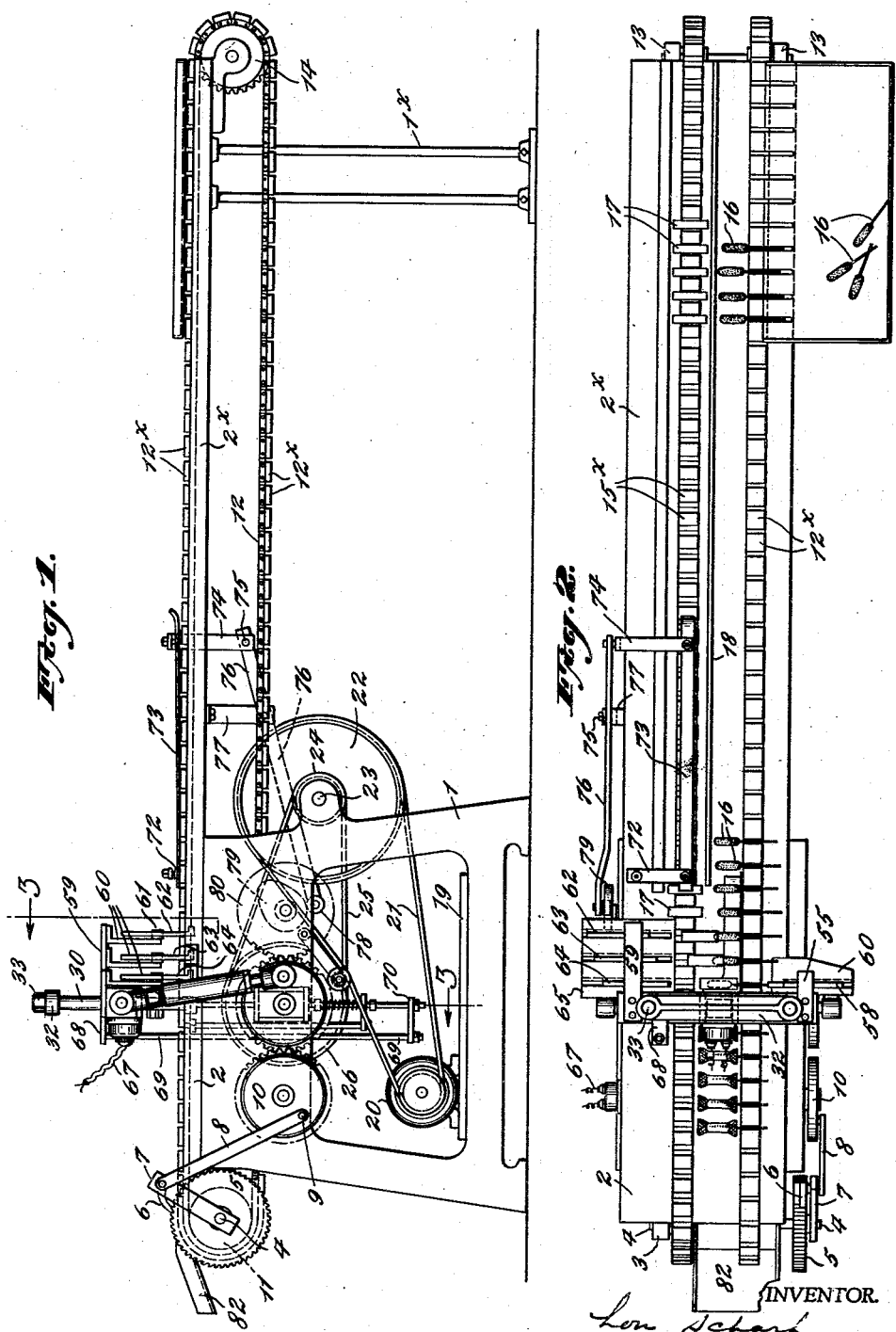

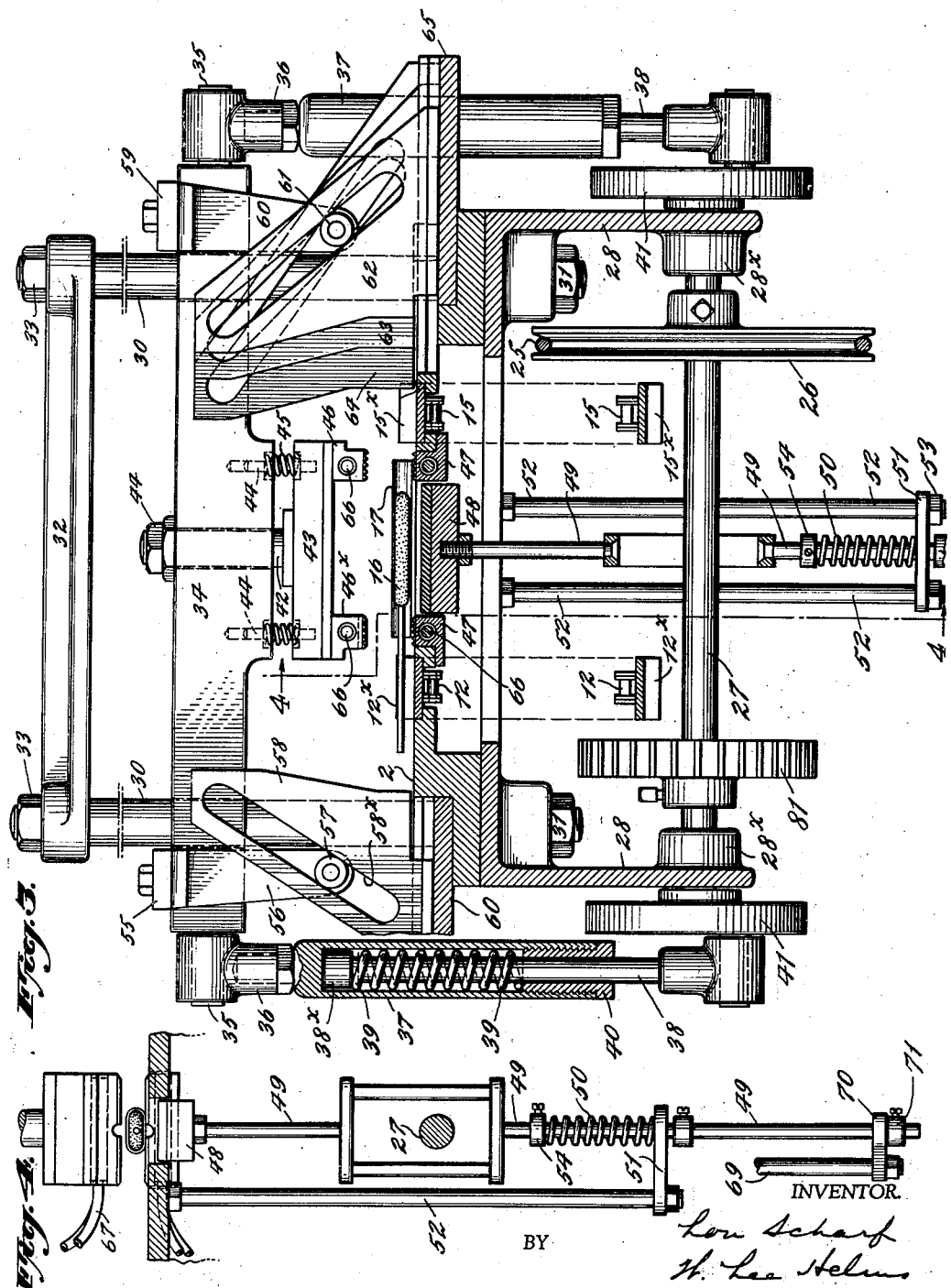

2,162,472

UNITED STATES PATENT OFFICE 2,162,472

MACHINE FOR CLOSING AND SEALING ARTICLES IN CELLULOSE TUBES

Lou Scharf, New York, N. Y., assignor to The Riverside Company, New York, N. Y., a partnership consisting of David Scharf, Joseph Scharf, and Lou Scharf Application May 12, 1937, Serial No. 142,157

4 Claims. (Cl. 226—2)

By means of the present invention, tubes made of a transparent cellulosic material and the like, including tubes of very light construction, are automatically fed simultaneously with articles to be enclosed within the tubes, toward a press-sealing element, and, in the course of their travel, the tubes and the articles are so associated that the articles are positioned within the tubes preliminary to the sealing of the latter about the articles.

The specific objects of the invention will be described with reference to the accompanying drawings, in which:

Figure 1 is a view in elevation of a machine constructed in accordance with the invention;

Figure 2 is a plan view thereof.

Figure 3 is an enlarged sectional elevation on the line 3—3, Figure 1.

Figure 4 is an enlarged vertical section on the line 4—4, Figure 3.

Referring to the drawings, 1 indicates a supporting standard having a horizontal table 2 which continues forwardly of the standard 1 as an elongated extension which may be supported upon a supplemental standard 1x. This extension is generally designated by the numeral 2x.

Supported for rotation in suitable bearing extensions from the standard 1, as, for example, bearing extension 3, Figure 2, is a shaft 4 having fixed thereon a ratchet wheel 5 which is given intermittent movement by a pawl 6 of a lever 7 having its fulcrum on shaft 4, the lever being swung back and forth by a link 8 pivoted at 9 upon a continuously rotating wheel 10.

Upon shaft 4 are spaced sprocket wheels, the position of one wheel being indicated at 11, Figure 1, each wheel receiving one of two endless chain-belts, one of the belts being shown at 12, Figure 1, the belts extending to the end of the table extension 2x and each being led over a sprocket wheel supported by suitable brackets 13, one of the wheels being shown at 14, Figure 1.

The links of each chain-belt carry spaced feed blocks, as, for example, the feed blocks 12x on chain-belt 12, and the feed blocks 15x on the second chain-belt 15.

Both the table 2 and the table extension 2x are formed with longitudinally extending guideways to support the blocks for movement in the uppermost leg of the chain-belts, these guideways being shown more particularly in Figure 3, and each guideway being formed with a central aperture to permit the passage of the chain elements below the guideway.

In the present embodiment, the feed blocks of one chain-belt are spaced a suitable distance apart to receive the sticks of lollypop candy elements 16, and the feed blocks of the second belt are spaced a suitable distance to receive between them cellulose tubes 17.

A table formed with marginal slots approximately the width of the lollypop sticks and spaced in accordance with the feed blocks 12x may overhang the belt 12 above table extension 2x, for insertion of the lollypops as shown in Figure 2, so that as the feed blocks 12x move toward standard 1, the lollypops will be picked up and given intermittent movement.

The tubes 7 may be placed by hand or automatically in the spaces between the feed blocks 15x, and by reference to Figure 2, it will be noted that the feed blocks will hold the article 16 and the tubes 17 in end-to-end register. A separation or guard rail 18 may extend longitudinally of table extension 2x between the articles carried by the two belts.

The drive mechanism

Standard 1 is provided with a lower platform 19 for supporting a motor 20 which, through belt 21, rotates a belt wheel 22 on shaft 23. The latter shaft carries a pulley 24 connected by belt 25 with belt wheel 26, the latter being best shown in Figure 3.

Belt wheel 26 is carried by a shaft 27 journalled in the bearing members 28x of brackets 28 secured to the underface of table 2 by means of the lower reduced threaded ends of a pair of guide shafts 30 receiving nuts 31.

Guide shafts 30 are connected by a cross bar 32 resting on shoulders provided through reducing the guide bars near their upper ends, the reduced ends being threaded to receive nuts 33 which hold the cross bar in position.

Mounted to reciprocate vertically on guide shafts 30 is a press frame 34 carrying at its ends pivot studs 35 embraced by the horizontal sleeves of T-connectors 36, the vertical sleeves of which are internally threaded to receive the reduced threaded ends of hollow shock members 37.

In each hollow shock member is disposed an eccentric arm 38 having an enlarged head 38x bearing upon one end of a spring 39, the lower end of the spring engaging a plug 40 threaded within and closing the hollow shock member. Eccentric arm 38 is held in pivotal relation and eccentrically of a drive wheel 41 on shaft 27.

Press frame 34 is formed with a vertical aperture through which passes the short supporting shaft 42 of die carrier 43, the upper end of the short shaft being threaded to receive a shouldered nut 44, the arrangement being such that die carrier 43 may have a limited vertical movement with respect to the press frame 34. Press frame 34 is also formed with a plurality of apertures to receive spring-holding studs 44 carrying springs 45 which press downwardly upon the die carrier 43. Die carrier 43 is provided with two serrated die members 46, 46x, the latter die member having a channelway to clear the stick of a lollypop.

Die members 46, 46x, are held above coacting lower die members 47 between which is a yielding support 48 for the lollypop or other article, support 48 being held upward by member 49 engaged by spring 50 which bears upon a horizontal arm 51 held upon rods 52 by nuts 53. Member 49 is free for movement vertically with respect to arm 51, its downward movement being in opposition to spring 50 and its return movement being effected through the tension of that spring. The influence of spring 50 on member 49 may be controlled by adjustment of the collar 54 which engages the upper end of the spring.

Bolted to press frame 34 and extending laterally therefrom is a bracket 55 formed with a depending arm 56, Figure 3, carrying a roller 57 entering the cam slot at 58x of a cam plate 58. Cam plate 58 is guided in the channelway of a guide member 60. In each downward movement of the press frame roller 57 moves cam plate 58 inwardly and engages the stick of each successive lollypop as the latter is moved into register with the dies.

Carried on the end of press frame 34 opposite bracket 55 is a second bracket 59, and depending from the bracket are a plurality of arms 60, each arm carrying at its lower end a roller such as 61 entering the cam slot of a cam plate, three cam plates being indicated at 62, 63 and 64, respectively. Each cam plate moves in guideway channels formed in guide plate 65. The cam slots of the respective cam plates 62, 63, 64 are in relatively different angular positions so that plate 64 starts its action from a point forwardly of plate 63 and the latter forwardly of plate 62.

When a given tube comes into register with plate 62 and the press frame is moved downwardly, plate 62 will engage the end of the tube and move the latter toward the candy head of the lollypop, generally causing the lollypop to be moved into the tube a certain distance. When the press frame moves upward and then down, the lollypop with the tube partly encircling its end, will be brought into register with plate 63 and the latter will move the tube still farther down upon the candy head, and in the succeeding reciprocation of the press frame, cam plate 64 will complete the positioning of the tube upon the candy head of the lollypop simultaneously with a centering movement of the lollypop through the action of cam plate 58. The next movement of the feed blocks will bring the lollypop and tube, each in proper centered position, between the die members, and the latter will seal the ends of the tube by compressing the opposed faces of the tube together. In this connection, the dies may be heated, as, for example, through certain heating elements indicated at 66 through electrical connections indicated at 67.

To assist in insuring a cushioned die compressing action, press frame 34 may carry an arm 68 to which is fixed a depending rod 69 which at its lower end carries an arm 70 apertured to receive the lower rod-like end of member 49 above a collar 71 fixed to said rod-like end. Therefore, in each downward movement of press frame 34, member 49 will be given a positive downward movement against the tension of spring 50. This action also gives a positive movement to support 48 preliminary to the die pressing operation.

When round cellulose tubes are used and the article is oval or has flattened top and bottom sides, it is desirable to flatten out the tubes as they approach the position at which relative movement of the tubes and articles cause the tubes to encircle the articles. To that end, I mount on a bracket 72 a presser bar 73, the latter near its end being connected to an angularly bent arm 74 pivoted at 75 to a lever 76 pivoted on fulcrum bracket 77. At the end of lever 76 opposite its pivot point, is a roller 78 in the path of a cam 79 on cam gear 80, which gear is driven from shaft 27 to intermesh with a gear 81 on said shaft. Gear 81 is also in mesh with the toothed member 10 for intermittently driving the chains 12 and 15.

In each rotation of cam 79, presser bar 73 is moved upwardly and then downwardly, and the bar will be positioned and adjusted to give the desired flattening of the tubes, followed by the insertion of the articles within the tubes and the sealing thereof by the die action hereinbefore described. The tube-sealed articles as they pass to the left beyond table 2 may drop into a downwardly inclined trough 82 for discharge to any suitable container or conveyor.

Having described my invention, what I claim and desire to secure by Letters Patent is as follows:

1. In a machine for press sealing articles in cellulose tubes, a die and means for imparting active movements thereto, an article holder adapted to hold a plurality of articles in spaced relation, means for moving the article holder step-by-step to carry the articles successively into register with the die, a cellulose tube holder adapted to position successive tubes each into register with an article held by the first carrier in advance of the die, and means for bodily moving successive tubes each onto an article held by its carrier between movements of the latter, said last named means being adapted to act upon the tube in successive idle positions of the article carrier between movements thereof.

2. A machine for press sealing articles in cellulose tubes comprising a die and means for imparting active movements thereto, an article holder adapted to hold a plurality of articles in spaced relation, means for moving the article holder step by step to carry the article successively into register with the die, a cellulose tube holder adapted to position successive tubes, each into register with an article held by the article holder in advance of the die, means for bodily moving successive tubes, each onto an article held by its article holder intermediate movements of the latter, a presser bar, and means for moving the same toward and from the tubes in advance of their article enclosing movements.

3. In a machine for press sealing articles in cellulose tubes, a die and means for actuating the same, two parallel endless belts, means carried by one belt for receiving a plurality of cellulose tubes in spaced relation, means carried by the second belt for holding a plurality of articles in spaced relation, means for moving the belts step-by-step to carry the articles and tubes into register with the die, means for imparting a relative movement to a tube and an article for enclosing the latter within the tube preliminary to an active movement of the die into engagement with the tube, said means comprising oppositely moving members, one engaging the end of an article and one engaging the end of a tube in register therewith, means for actuating said oppositely moving members, and a plurality of members adapted to successively act upon a tube for moving the same relatively to an article preliminary to the action of the oppositely moving members which engage the article and the tube.

4. In a machine for press sealing articles in cellulose tubes, a reciprocatory press frame and a die carried thereby, means for reciprocating the press frame, a table, two endless belts moving horizontally on the table and thence under the same, means carried by one belt for holding a plurality of tubes in spaced relation, means carried by the second belt for holding a plurality of articles in spaced relation and each opposite the open end of the tube, a plurality of pusher members into register with which the tubes are successively moved, means for actuating the pusher members so that they act successively upon the tubes to move them endwise onto the articles opposite them, and centering means for the articles within the tubes, acting preliminary to an active movement of the press frame and die.

LOU SCHARF.